Figure 1:
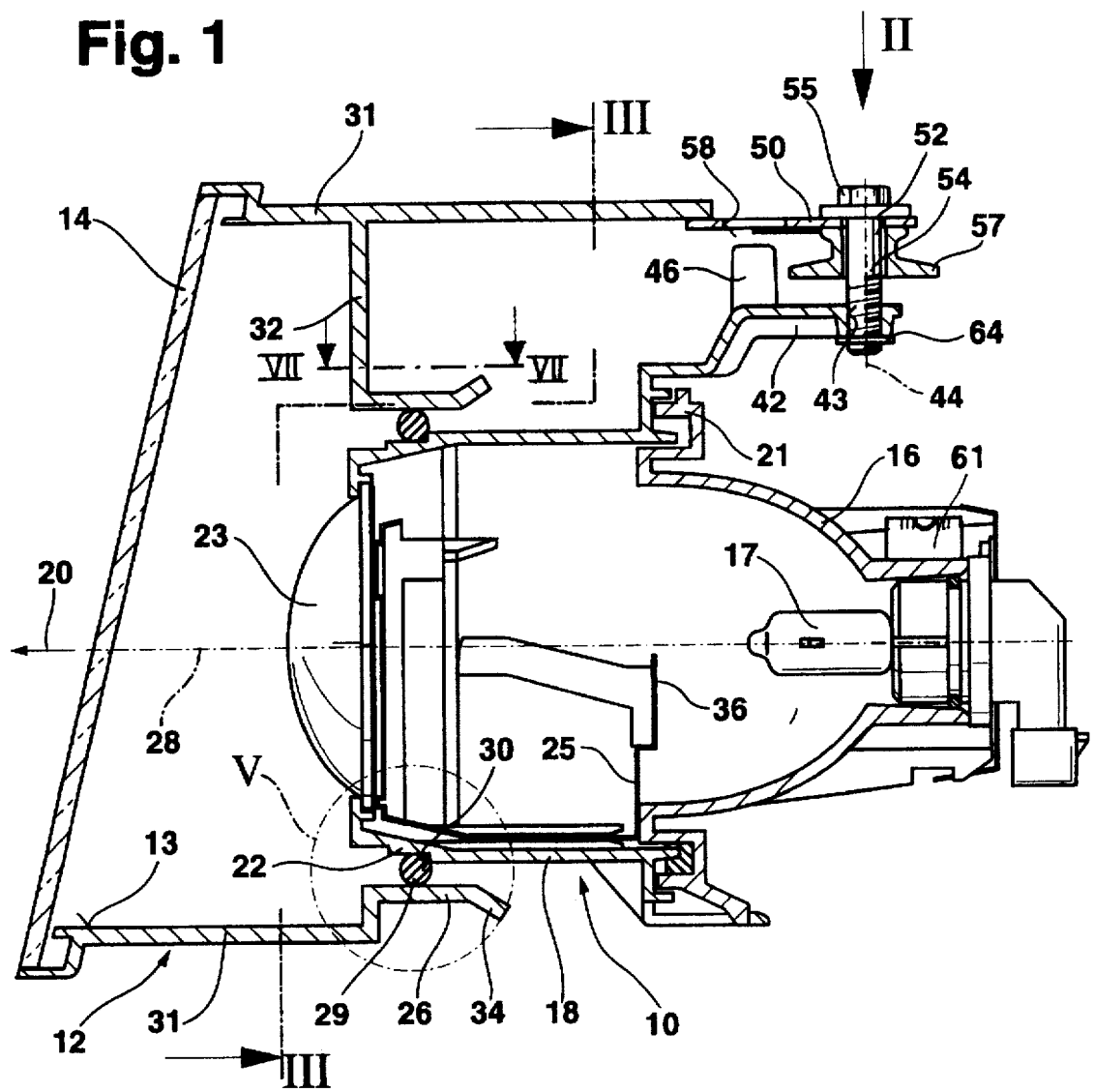

United States Patent [19]
Bertling et al.

[11] Patent Number: 5,709,452
[45] Date of Patent: *Jan. 20, 1998

[54] VEHICLE HEADLAMP

[75] Inventors: Johannes Bertling, Vaihingen; Hans Daumueller, Bodelshausen; Karl-Otto Dobler, Reutlingen; Juergen Mueller, Albstadt; Lothar Streit, Sonnenbuehl; Albert Vent, Eschweiler, all of Germany

[73] Assignee: Robert Bosch GmbH, Stuttgart, Germany

[*] Notice: The term of this patent shall not extend beyond the expiration date of Pat. No. 5,580,150.

[21] Appl. No.: 548,665

[22] Filed: Oct. 26, 1995

[30] Foreign Application Priority Data

Oct. 27, 1994 [DE] Germany .................. 44 38 329.0

[51] Int. Cl.⁶ .................................................. B60Q 1/04
[52] U.S. Cl. .................... 362/66; 362/284; 362/289; 362/428; 362/288
[58] Field of Search .................. 362/61, 66, 80, 362/267, 288, 289, 269, 273, 274, 428, 287, 418

[56] References Cited

U.S. PATENT DOCUMENTS

| | | | |
|---|---|---|---|
| 4,249,232 | 2/1981 | Dick | 362/61 |
| 4,866,577 | 9/1989 | Jocher et al. | 362/288 |
| 5,113,330 | 5/1992 | Makita | 362/61 |
| 5,237,330 | 8/1993 | Van Oel et al. | 362/61 |
| 5,453,914 | 9/1995 | Dobler | 362/66 |
| 5,580,150 | 12/1996 | Bertling et al. | 362/66 |

FOREIGN PATENT DOCUMENTS

| | | |
|---|---|---|
| 0 129 922 | 6/1984 | European Pat. Off. . |
| 0224 739 | 11/1986 | European Pat. Off. . |
| 0580496A1 | 7/1993 | European Pat. Off. . |
| 8713631 | 10/1987 | Germany . |

*Primary Examiner*—Thomas M. Sember
*Attorney, Agent, or Firm*—Michael J. Striker

[57] ABSTRACT

The headlamp has a headlamp insert (10), which is mounted pivotably at its front marginal region (22) in a portion (26) of a receiving fixture (12) and which is acted upon, at a distance from its bearing point, by an adjusting device. The receiving fixture portion (26) surrounds the headlamp insert (10) on its periphery and between the headlamp insert (10) and the receiving fixture portion (26) there is clamped an elastically deformable element (29) in the form of a ring. By means of the ring (29), the headlamp insert (10) is mounted pivotably without play in the receiving fixture portion (26). Changes in distance which, upon a swivel motion of the headlamp insert (10), arise between this and the receiving fixture portion (26) are counterbalanced by the ring (29) and this ring, together with the receiving fixture portion (26), constitutes a very simple mounting for the headlamp insert (10).

8 Claims, 4 Drawing Sheets

VEHICLE HEADLAMP

PRIOR ART

The invention derives from a vehicle headlamp of the generic type of claim 1.

A headlamp of this kind is known by virtue of German Utility Model 87 13 631. This headlamp has a headlamp insert comprising a reflector and a cover plate attached thereto. The headlamp insert is held pivotably on a receiving fixture in the form of a supporting frame. The headlamp insert is mounted in the manner of a three-point bearing on the supporting frame and can be pivoted in order to adjust the alignment of its optical axis in a vertical longitudinal plane and in order to adjust the alignment of its optical axis in a horizontal longitudinal plane. At a respective distance from the bearing points, the headlamp insert is acted upon by an adjusting device for its adjustment in the vertical longitudinal plane and by an adjusting device for its adjustment in the horizontal longitudinal plane. The bearing points of the headlamp insert are formed by ball journals and ball joint bearings, of which three in number are respectively necessary. This headlamp therefore requires a large number of structural parts, which leads to high production costs and complex assembly but which ought to be avoided in mass production.

ADVANTAGES OF THE INVENTION

The headlamp according to the invention, having the features according to claim 1, has the advantage in contrast to the above that the pivotable mounting of the headlamp insert is achieved very simply and with few structural parts.

Advantageous designs and refinements of the invention are defined in the contingent claims. The configuration of the elastically deformable element as a ring, as defined in claim 3, allows this to be simultaneously used as a seal between the receiving fixture and the headlamp insert. The configuration according to claim 7 serves to ensure that the headlamp insert cannot be twisted about the optical axis when the alignment of the optical axis is adjusted.

DRAWING

Figure 2:
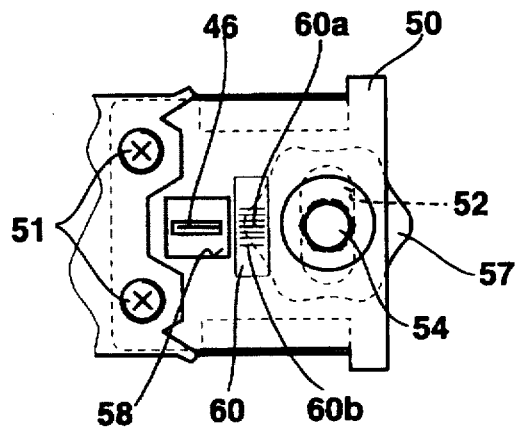
Figure 3:
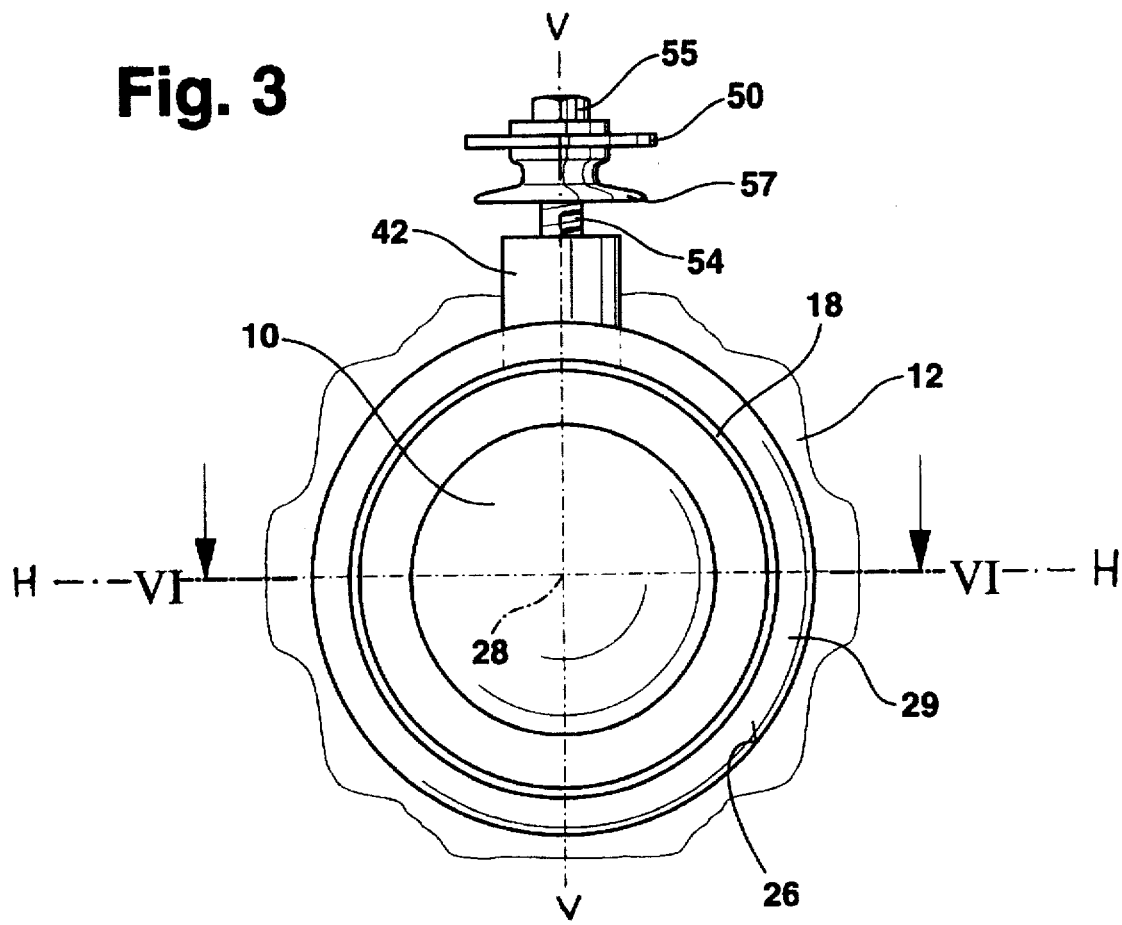
Figure 4:
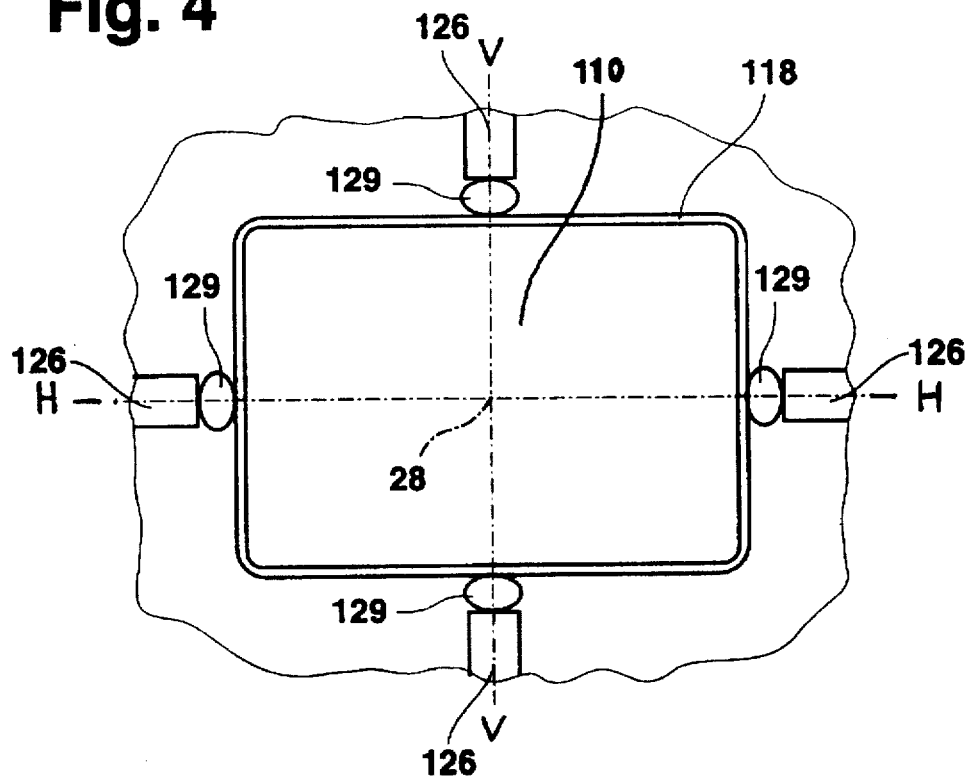
Figure 5:
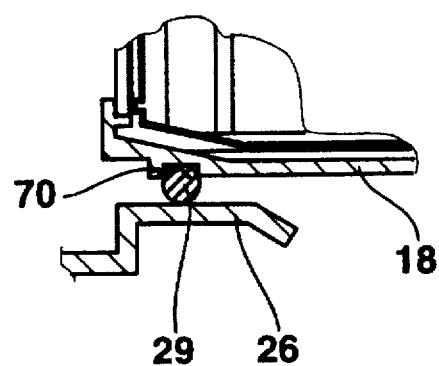
Figure 6:
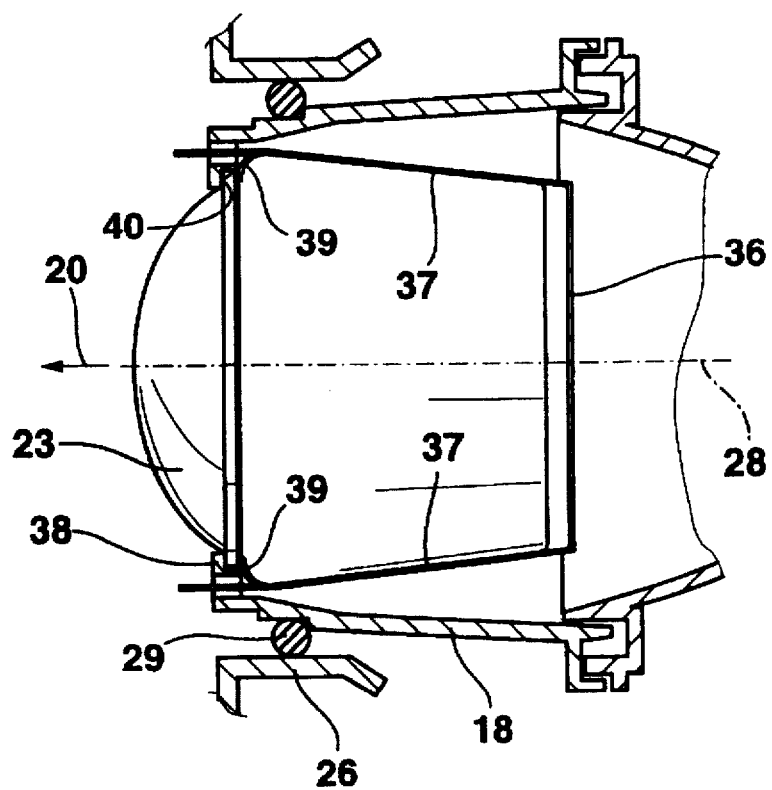
Figure 7:
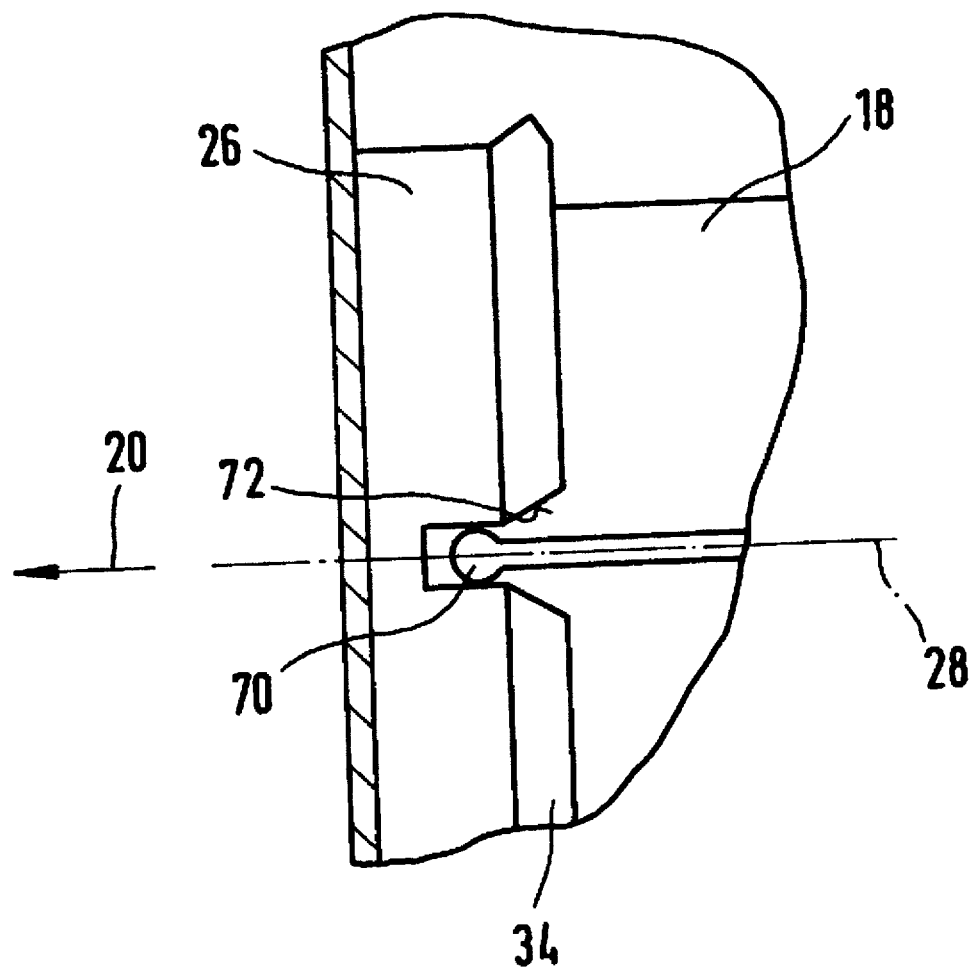

An illustrative embodiment of the invention is explained in greater detail in the following description and represented in the drawing, in which:

FIG. 1 shows a vehicle headlamp having a receiving fixture and an adjusting device for the headlamp in a vertical longitudinal section, FIG. 2 shows selected portions of the headlamp in a view in the arrow direction II in FIG. 1, FIG. 3 shows the headlamp in a cross section along the line III—III in FIG. 1, FIG. 4 shows a modified embodiment of the headlamp in cross section, FIG. 5 shows the detail of the headlamp, denoted by V in FIG. 1, having a modified embodiment of an arrangement of an elastically deformable element, FIG. 6 shows selected portions of the headlamp in a horizontal longitudinal section along the line VI—VI in FIG. 3, and FIG. 7 shows selected portions of the headlamp in a section along the line VII—VII in FIG. 1.

DESCRIPTION OF THE ILLUSTRATIVE EMBODIMENT

A vehicle headlamp, especially for motor vehicles, represented in FIGS. 1 to 7 has a headlamp insert 10, which is disposed in a receiving fixture 12. The receiving fixture 12 is part of the bodywork of the vehicle, but can also be a supporting frame connected to the bodywork or a housing connected to the bodywork. The receiving fixture 12 has a light-radiating opening 13, which is sealed with a light-transmitting cover plate 14. The cover plate 14 can be configured as a smooth plate or can be provided with optically active elements. The headlamp insert 10 comprises a reflector 16, a light source 17 inserted in the latter, a tubular carrier part 18, which is connected to the front rim 21, pointing in the light-radiating direction 20, of the reflector 16, a lens 23 disposed on the front rim 22, pointing in the light-radiating direction 20, of the carrier part 18, and a diaphragm 25 disposed within the carrier part 18 in the region of the front rim 21 of the reflector 16. The above-described headlamp insert 10 forms a so-called "projection system". The headlamp insert can also however be configured as a reflexion system and then merely comprises the reflector, to whose front rim there is attached, where appropriate, a cover plate, the light source inserted in the reflector and, where appropriate, a supporting frame accommodating the reflector.

The headlamp insert 10 is mounted in its front region pointing in the light-radiating direction 20, i.e. in the region of the front rim 22 of the carrier part 18, pivotably in the receiving fixture 12, at least in a vertical longitudinal plane VV marked in FIG. 3. If the headlamp insert is configured as a reflexion system, then it is mounted pivotably in the region of the front rim of the reflector. Preferably, the headlamp insert 10 is mounted such that it is spatially pivotable, i.e. such that it can additionally be pivoted in a horizontal longitudinal plane HH marked in FIG. 3. The carrier part 18 is disposed, at least in the region of its front rim 22, in a portion 26 of the receiving fixture 12 and is surrounded, at least on part of its periphery, by said receiving fixture portion.

The receiving fixture portion 26 is disposed, counter to the light-radiating direction 20, remote from the light-radiating opening 13 of the receiving fixture 12 and is configured, in the cross section perpendicular to the optical axis 28, smaller than the light-radiating opening 13. The receiving fixture portion 26 is configured in one piece with the receiving fixture 12 and is connected by walls 31 to the front rim of the receiving fixture 12, which front rim surrounds the light-radiating opening 13. In the installation position of the headlamp in the vehicle, the receiving fixture portion 26 is offset toward the lower rim of the receiving fixture 12, there being configured above the receiving fixture portion 26 a roughly vertically extending wall 32 of the receiving fixture 12, by which the region lying behind it is concealed, so that this region cannot be seen from outside the headlamp. The receiving fixture portion 26 is configured roughly in the shape of a hollow cylinder and points with its free end 34 counter to the light-radiating direction 20. The free end 34 of the receiving fixture portion 28 widens counter to the light-radiating direction 20, the widening being able to be realized, for example, conically.

In a first embodiment of the headlamp, the headlamp insert 10 and the carrier part 18, as represented in FIG. 3, are of rounded, for example circular or oval, configuration in the cross section roughly perpendicular to the optical axis 28, and the receiving fixture portion 26, in its free cross section roughly perpendicular to the optical axis 28 of the headlamp insert 10, is likewise of rounded configuration, matched to the cross-sectional shape of the carrier part 18. On the carrier part 18, in the region of its front rim 22, there is disposed an elastically deformable element 29, which is configured as a ring surrounding the carrier part 18 over the whole of its periphery. The inner diameter of the ring 29 in the non-fitted state is somewhat smaller than the outer diameter of the carrier part 18 at its front rim 22, so that the ring 29 is disposed on the carrier part 18 under tension. The front rim 22 of the carrier part 18 has, in the light-radiating direction 20, a region of reduced external cross section, so that on the periphery of the carrier part 18 there is formed a step 30 pointing in the light-radiating direction 20. The ring 29 is disposed on the region of smaller external cross section and is supported against the step 30 counter to the light-radiating direction 20. Toward its end, the carrier part 18 can have a further-reduced external cross section to allow the ring 29 to be easily fitted. The internal cross section of the receiving fixture portion 26 is somewhat smaller than the external cross section of the ring 29 disposed on the carrier part 18, so that the ring 29, when the carrier part 18 is disposed in the receiving fixture portion 26, is compressed somewhat as it is elastically deformed, thereby achieving a play-free, pivotable mounting of the carrier part 18 in the receiving fixture portion 26. Upon a swivel motion of the carrier part 18, the changes in distance which herein arise between the carrier part 18 and the receiving fixture portion 26 are counterbalanced by an elastic deformation of the ring 29.

The ring 29 is used, apart from for the mounting of the carrier part 18, simultaneously as a sealing element, which prevents dirt and moisture from penetrating into that region of the receiving fixture 12 in which the headlamp insert 10 is disposed.

The headlamp insert 10 is secured in the receiving fixture portion 26 against twisting about the optical axis 28. The anti-twist securement is achieved, as represented in FIG. 7, by a projection 70 which protrudes upward from the carrier part 18 and engages, with minor play in the tangential direction relative to the optical axis 28, in a recess 72 in the free end 34 of the receiving fixture portion 26, which recess extends roughly parallel to the optical axis 28. The projection 70 is displaceable in the recess 72 in the direction of the optical axis 28 so as not to prevent the headlamp insert 10 from being pivoted in order to adjust the alignment of the optical axis 28 in the vertical longitudinal plane VV. That end of the projection 70 which is disposed in the recess 72 is spherically configured and the recess 72 is widened in its marginal region counter to the light-radiating direction 20 to enable the headlamp insert 10 to be pivoted in the horizontal longitudinal plane HH in order to adjust the alignment of the optical axis 28. The arrangement of the projection 70 and recess 72 can also be inverted, so that the projection is disposed on the receiving fixture portion and the recess on the carrier part. Finally, the projection 70 and the recess 72 can be disposed at any chosen points on the periphery of the receiving fixture portion 26 and on that of the carrier part 18.

In a modified embodiment of the headlamp represented in FIG. 5, the carrier part 18 has in its outer periphery, in the region of the front rim 22, a circumferential annular groove 70, into which the ring 29 partially intrudes yet juts with its outer rim over the carrier part 18 in the radial direction. In this embodiment also, the carrier part 18 is mounted by means of the ring 29 such that it can be pivoted in a play-free manner in the receiving fixture portion 26.

FIG. 4 illustrates a modified embodiment of the headlamp in which a plurality of elastically deformable elements 129 are scattered over the periphery of the carrier part 118. The receiving fixture portion is formed by a plurality of stays 126 scattered over the periphery of the carrier part 118, which stays are directed roughly radially to the carrier part 118. The elastically deformable elements 129 are clamped between the outer periphery of the carrier part 118 and a respective stay 126. The elastically deformable elements 129 can be fixedly connected to the carrier part 118 or to the stays 126. The stays 126, viewed in the direction of the optical axis 28 of the headlamp insert 110, have such an extent that the elastically deformable elements 129, even in the pivoted settings of the carrier part 118, continue to bear against the stays 126. In this embodiment of the headlamp, the headlamp insert 110 and the carrier part 118 are rectangularly configured in the cross section roughly perpendicular to the optical axis 28, a lower and upper rectangle side being roughly horizontally disposed and the two lateral rectangle sides being roughly vertically disposed respectively. The above-described-embodiment of the elastically deformable elements 129 and of the receiving fixture portion with the stays 126 can also be used in any other choice of cross-sectional shapes of the headlamp insert 110 or carrier part 118. As in the embodiment according to FIG. 1 and FIG. 7, the headlamp insert 110 is secured in the receiving fixture portion 126 against twisting about the optical axis 28.

The carrier part 18 of the headlamp insert 10 is fixedly connected to the front rim 21 of the reflector 16, for example bonded or latch-locked. The diaphragm 25 is fastened in the carrier part 18 and its actual diaphragm portion 36 is disposed roughly in the plane of the front rim 21 of the reflector 16, as represented in FIG. 1. The diaphragm portion 36 extends perpendicular to the optical axis 28 and substantially beneath this and forms, when the headlamp is in use, an upper light-dark boundary of the light beam radiating from the headlamp. As represented in FIG. 6, the diaphragm 25 additionally has two arms 37, which protrude from the diaphragm portion 36 in the light-radiating direction 20 and the ends of which jut through a respective opening in the front end wall 38 of the carrier part 18, which front end wall surrounds the lens 23. Within the carrier part 18, in front of the lens 23 on each arm 37, a hook 39 is respectively bent radially inward over the rim of the lens 23, which hooks hold the lens 23 in bearing contact against a step 40 on the end wall 38 of the carrier part 18.

In the region of the front rim 21 of the reflector 16 there protrudes upward from the carrier part 18, in the installation position of the headlamp on the vehicle, an arm 42, which extends at a distance from the reflector 16 counter to the light-radiating direction 20 and has in the region of its free end a threaded bore 43, the axis 44 of which runs at least approximately perpendicular to the optical axis 28 and in the vertical direction. The axis 44 of the threaded bore 43 lies in the vertical longitudinal plane VV, containing the optical axis 28, of the headlamp insert 10. The carrier part 18 preferably consists of synthetic material, the arm 42 being configured in one piece with the latter. The carrier part 18 can also however consist of sheet metal and the arm 42 can be configured as a separate part connected to the carrier part 18. The arm 42 can additionally, where appropriate, have a boss 46, which protrudes upwardly from it and the function of which will be further explained below.

The upper wall 31 of the receiving fixture 12 extends counter to the light-radiating direction 20 over the headlamp insert 10 to close to the free end of the arm 42 of the carrier part 18. To the wall 31 there is fixedly connected a plate-shaped part 50, which thus forms part of the receiving fixture 12 and constitutes an extension of the wall 31. The plate 50 is disposed above the arm 42 of the carrier part 18 and, viewed in the horizontal direction, extends over only part of the width of the wall 31 in the region of the arm 42. The plate 50 is fastened to the wall 31, for example, by means of one or more screws 51 and extends at least approximately perpendicular to the optical axis 28 and horizontally. The plate 50 can consist, for example, of synthetic material and has an opening 52, which is preferably configured as a long hole, the longitudinal extent of which runs in the horizontal direction and at least approximately perpendicular to the optical axis 28.

Through the long hole 52 there is placed, from the top side of the headlamp, i.e. in the arrow direction III in FIG. 1, the view of which is represented in FIG. 2, an adjusting screw 54, which is supported by its head 55 against the top side of the plate 50 at the rim close to the long hole 52 and whose longitudinal axis, which is identical with the longitudinal axis 44 of the threaded bore 43, runs at least approximately vertical and perpendicular to the optical axis 28. The adjusting screw 54 is screwed in the threaded bore 43 of the arm 42, a female part 57 being screwed on the adjusting screw 54 in the region between the arm 42 and plate 50, which female part is rotatable on the adjusting screw 54. The end of the adjusting screw 54 juts out of the arm 42 on the bottom side and has an annular groove in which a securing ring 64 is clamped. The female part 57 has a diameter such that it can be acted upon beneath the plate 50 from diagonally above, thereby enabling it to be twisted from the top side or from the rear side of the headlamp.

The plate 50 can also be configured in one piece with the upper wall 31 of the receiving fixture 12, the long hole 52 in this case being configured directly in the end region of the wall 31. The adjusting screw 54 forms together with the female part 57 an adjusting device, which acts upon the headlamp insert 10 counter to the light-radiating direction 20 remote from its pivotably mounted front marginal region 22.

The plate 50 can additionally, where appropriate, have a further opening 58, through which the boss 46 of the arm 42 juts or, as represented in FIG. 3, is at least visible when viewed from the top side of the headlamp in the arrow direction III in FIG. 1. The further opening 58, like the long hole 52, is of elongated configuration and runs with its longitudinal extent roughly parallel to that of the long hole 52. Along the longitudinal extent of the opening 58 there is disposed on its rim a scale 60, with which the boss 46 interacts as a marking.

The fitting of the headlamp and the adjustment of the headlamp insert 10 is described below. The headlamp insert 10 is pre-fitted as a complete unit and the ring 29 is slid onto the front rim 22 of the carrier part 18. The headlamp insert 10 is inserted into the receiving fixture portion 26 from the rear side of the receiving fixture 12 in the light-radiating direction 20, which is easily possible as a result of the widening of the free end region of the receiving fixture portion 26. The projection 70 is hereupon introduced into the recess 72. The adjusting screw 54 is passed from above through the long hole 52 in the plate 50 and from below the female part 57 is screwed onto the adjusting screw 54. Then the adjusting screw 54 is screwed into the threaded bore 43 in the arm 42 of the carrier part 18 and the securing ring 64 is inserted into the annular groove. If the female part 57 on the adjusting screw 54 is screwed far enough upward that it comes to bear against the bottom side of the plate 50 and is firmly tightened, then the adjusting screw 54 is fixed to the plate 50 so that it is neither displaceable in the direction of its longitudinal axis 44 nor twistable about its longitudinal axis 44. In this case, the headlamp insert 10 is fixed in the receiving fixture 12.

For an adjustment of the headlamp insert 10, i.e. of the alignment of its optical axis 28, the female part 57 is loosened. For an adjustment of the alignment of the optical axis 28 in the vertical longitudinal plane, i.e. of the inclination of the optical axis 28, the adjusting screw 54, once the female part 57 is loosened, is twisted, whereby, depending upon the direction of rotation, the headlamp insert 10 is moved vertically upward or downward in the region of its arm 42 by virtue of the threaded connection to the adjusting screw 54. The adjusting screw 54 is herein located with its head 55 in bearing contact against the top side of the plate 50, this having been brought about by the weight of the headlamp insert 10. The securing ring 64 serves to ensure that the adjusting screw 54 cannot be rotated completely out of the threaded bore 43 of the arm 42.

The headlamp insert 10, when the adjusting screw 54 is twisted, performs a swivel motion about its front marginal region, which is mounted without play in the receiving fixture portion 26 by means of the elastic element 29, so that the inclination of the optical axis 28 in the vertical longitudinal plane VV adjusted. The projection 70 is herein displaced in the recess 72. The elastic element 29 is herein able to counterbalance changes in distance which, upon the swivel motion of the headlamp insert 10, arise between the front rim 22 of the carrier part 18 and the receiving fixture portion 26. If the inclination of the optical axis 28 is correctly adjusted, then the female part 57 is re-tightened firmly to the plate 50, so that the headlamp insert 10 is fixed. If the adjusting screw 54, when the alignment of the optical axis 28 in the vertical longitudinal plane VV is correctly adjusted, does not run perpendicular to the plate 50, the plate 50, as it is slightly elastically deformed, is able to adjust to this tilt, so that a planar bearing contact of the head 55 of the adjusting screw 54 and the female part 57 against the plate 50, and hence a secure fixation of the adjusting screw 54, is nevertheless made possible. In order to check the adjustment of the inclination of the optical axis 28, it is possible to connect to the headlamp insert, in a known manner, a water level 61, which is visible from outside the receiving fixture 12 and which indicates the deviation of the actual inclination setting from a predefined correct inclination setting. If, for the headlamp insert 10, only one adjusting option for the alignment of the optical axis 28 in the vertical longitudinal plane VV is necessary, then the opening 52 in the plate 50 does not need to be configured as a long hole, but is configured in its diameter such that the adjusting screw 54 passes through it with minor play.

Once the female part 57 is loosened, the alignment of the optical axis 28 in the horizontal longitudinal plane HH can additionally be adjusted by the adjusting screw 54 being displaced in the long hole 52 in the direction of its longitudinal extent. The headlamp insert 10 is also herein moved in the region of its arm 42 in the horizontal direction and pivoted about its front marginal region disposed in the receiving fixture portion 26. The projection 70 engaging in the recess 72 serves to ensure that the headlamp insert, when pivoted, is not also inadvertently twisted about the optical axis 28. The checking of the alignment of the optical axis 28 in the horizontal longitudinal plane HH is taken care of by the boss 46 of the arm 42, which juts upward through the opening 58 in the plate 50 and interacts with the scale 60 on the rim of the opening 58. The scale 60 has a particularly prominent scale marking 60a to which the boss 46, when the alignment of the optical axis 28 is correctly adjusted, points, and a plurality of further scale markings 60b indicating a deviation in the alignment of the optical axis 28 from the correct alignment.

The above-described configuration of the headlamp enables the alignment of the optical axis 28 to be adjusted from the top side of the headlamp. In addition, with the single adjusting screw 54, an adjustment of the alignment of the optical axis 28 of the headlamp insert 10 both in the vertical longitudinal plane and in the horizontal longitudinal plane is made possible. Both adjustments are herein possible independently from each other, i.e. when the alignment of the optical axis 28 in the vertical longitudinal plane is adjusted by twisting of the adjusting screw 54, the alignment in the horizontal longitudinal plane is not altered, and conversely, when the alignment of the optical axis 28 in the horizontal longitudinal plane is adjusted by displacement of the adjusting screw 54, the alignment in the vertical longitudinal plane is not altered.

We claim:

1. A vehicle headlamp, comprising a headlamp insert having a reflector; a receiving fixture mounting said headlamp insert; adjusting means acting on said headlamp insert at a distance from a bearing point of said headlamp insert and pivoting said headlamp insert in order to adjust an alignment of an optical axis of said headlamp insert, said receiving fixture having a portion which surrounds said headlamp insert at least on a part of a periphery of said headlamp insert, said headlamp insert being mounted pivotally in said receiving fixture portion; and means for supporting said headlamp insert and including a single elastically deformable element clamped between said headlamp insert and said receiving fixture portion and mounting said headlamp insert pivotally in said receiving fixture portion; said deformable element being a sole support for the headlamp insert.

2. A vehicle headlamp as defined in claim 1, wherein said headlamp insert has a front marginal region, said headlamp insert being located in said receiving fixture portion so that said front marginal region points in a light-radiating direction.

3. A vehicle headlamp as defined in claim 2, wherein said receiving fixture portion surrounds said headlamp insert over a whole periphery of said headlamp insert, said elastically deformable element being formed as a ring which surrounds said headlamp insert in the region of said receiving fixture portion over a whole of its periphery.

4. A vehicle headlamp as defined in claim 1, wherein said receiving fixture portion is formed substantially as a hollow cylinder having a longitudinal extent which is at least approximately parallel to the optical axis of said headlamp insert, said receiving fixture portion having a cross-sectional shape substantially corresponding to a cross-sectional shape of said headlamp insert.

5. A vehicle headlamp as defined in claim 1 or 2, wherein said receiving fixture portion is formed by a plurality of stays scattered over a periphery of said headlamp insert, said elastically deformable element being clamped between said stays and an outer periphery of said headlamp insert.

6. A vehicle headlamp as defined in claim 1, wherein said headlamp insert also has a lens which is disposed remote from said reflector in a light-radiating direction, said headlamp insert having a carrier part connected to said reflector and holding said lens.

7. A vehicle headlamp as defined in claim 6, wherein said headlamp insert is located with said carrier part in said receiving fixture portion, said elastically deformable element being clamped between said carrier part and said receiving fixture portion.

8. A vehicle headlamp as defined in claim 1, wherein said headlamp insert is secured in said receiving fixture portion against twisting about the optical axis; and further comprising means for securing said headlamp insert in said receiving fixture portion.

* * * * *